United States Patent
Schilmoeller et al.

(10) Patent No.: US 7,435,436 B2
(45) Date of Patent: Oct. 14, 2008

(54) MICROWAVE POPCORN PACKAGE

(75) Inventors: Lance Bernard Schilmoeller, Minnetonka, MN (US); Matthew Adam Roth, Chaska, MN (US); Deborah Lynn Christensen, Maple Grove, MN (US)

(73) Assignee: ConAgra Foods PDM, Inc., Omaha, NE (US)

( * ) Notice: Subject to any disclaimer, the term of this patent is extended or adjusted under 35 U.S.C. 154(b) by 133 days.

(21) Appl. No.: 10/299,537

(22) Filed: Nov. 18, 2002

(65) Prior Publication Data

US 2004/0096550 A1    May 20, 2004

(51) Int. Cl.
*B65D 81/34* (2006.01)
*B65D 81/32* (2006.01)

(52) U.S. Cl. .................... 426/107; 426/113; 426/120

(58) Field of Classification Search .................. 426/120, 426/107
See application file for complete search history.

(56) References Cited

U.S. PATENT DOCUMENTS

| | | | | |
|---|---|---|---|---|
| 2,606,121 A | * | 8/1952 | Peters | 426/112 |
| 2,899,318 A | * | 8/1959 | Long | 426/112 |
| 3,074,544 A | * | 1/1963 | Bollmeier et al. | 206/219 |
| 3,156,352 A | * | 11/1964 | Hayhurst | 206/219 |
| 3,293,048 A | * | 12/1966 | Kitterman | 426/113 |
| 3,360,440 A | * | 12/1967 | Haab et al. | 435/34 |
| 3,511,436 A | * | 5/1970 | Kessler | 383/210 |
| 3,563,768 A | * | 2/1971 | Melnick | 426/120 |
| 3,573,069 A | * | 3/1971 | Keller | 426/120 |
| 3,589,272 A | * | 6/1971 | Bouladon et al. | 99/295 |
| 3,672,907 A | * | 6/1972 | Hudson | 426/241 |
| 3,835,280 A | * | 9/1974 | Gades et al. | 219/728 |
| 3,851,574 A | * | 12/1974 | Katz et al. | 426/107 |
| 4,227,614 A | * | 10/1980 | Hollander, Jr. | 206/459.5 |
| 4,557,377 A | * | 12/1985 | Maloney | 206/219 |
| 4,596,713 A | | 6/1986 | Burdette | |
| 4,806,371 A | | 2/1989 | Mendenhall | |
| 4,904,488 A | | 2/1990 | LaBaw et al. | |
| 4,942,277 A | * | 7/1990 | Narberes | 219/734 |
| 4,973,810 A | | 11/1990 | Brainer | |
| 4,982,064 A | | 1/1991 | Hartman et al. | |
| 4,987,280 A | | 1/1991 | Kanafani et al. | |
| 5,075,119 A | | 12/1991 | Mendenhall | |
| 5,097,107 A | | 3/1992 | Watkins et al. | |
| 5,834,046 A | | 11/1998 | Turpin et al. | |
| 6,013,291 A | | 1/2000 | Glass et al. | |
| 6,254,907 B1 | * | 7/2001 | Galomb | 426/115 |
| 6,289,889 B1 | * | 9/2001 | Bell et al. | 126/263.07 |

(Continued)

FOREIGN PATENT DOCUMENTS

DE    27 39 961 A1    3/1979

(Continued)

*Primary Examiner*—Steven L Weinstein
(74) *Attorney, Agent, or Firm*—Merchant & Gould, P.C.

(57) ABSTRACT

A microwave popcorn product is provided. The popcorn product includes a package having a popcorn composition therein, the popcorn composition including popcorn kernels, an oil/fat component that can be trans-fat free or low-trans fat, and optional ingredients such as flavorants. At least a portion of the popcorn composition is retained within an internal containment package within the package. The containment package provides containment of any liquid or non-solid components of the popcorn composition. A burst facilitator can be used with the containment pouch; usually, this burst facilitator is water or other form of moisture.

17 Claims, 10 Drawing Sheets

U.S. PATENT DOCUMENTS 6,509,047 B2 * 1/2003 Edomwonyi ................. 426/107
6,602,466 B2 * 8/2003 Hamilton et al. ............... 422/37

FOREIGN PATENT DOCUMENTS

| | | | |
|---|---|---|---|
| EP | 0 298 711 A1 | | 1/1989 |
| JP | 59-227253 | * | 12/1984 |
| JP | 63-131926 | * | 6/1988 |
| JP | 6-169707 | * | 6/1994 |
| JP | 8-11947 | * | 1/1996 |
| JP | 9-267872 | * | 10/1997 |
| JP | 10-42800 | * | 2/1998 |
| JP | 10-194355 | * | 7/1998 |
| JP | 2000-211676 | * | 8/2000 |
| JP | 2002-153217 | * | 5/2002 |
| WO | WO 00/61456 | | 10/2002 |

* cited by examiner

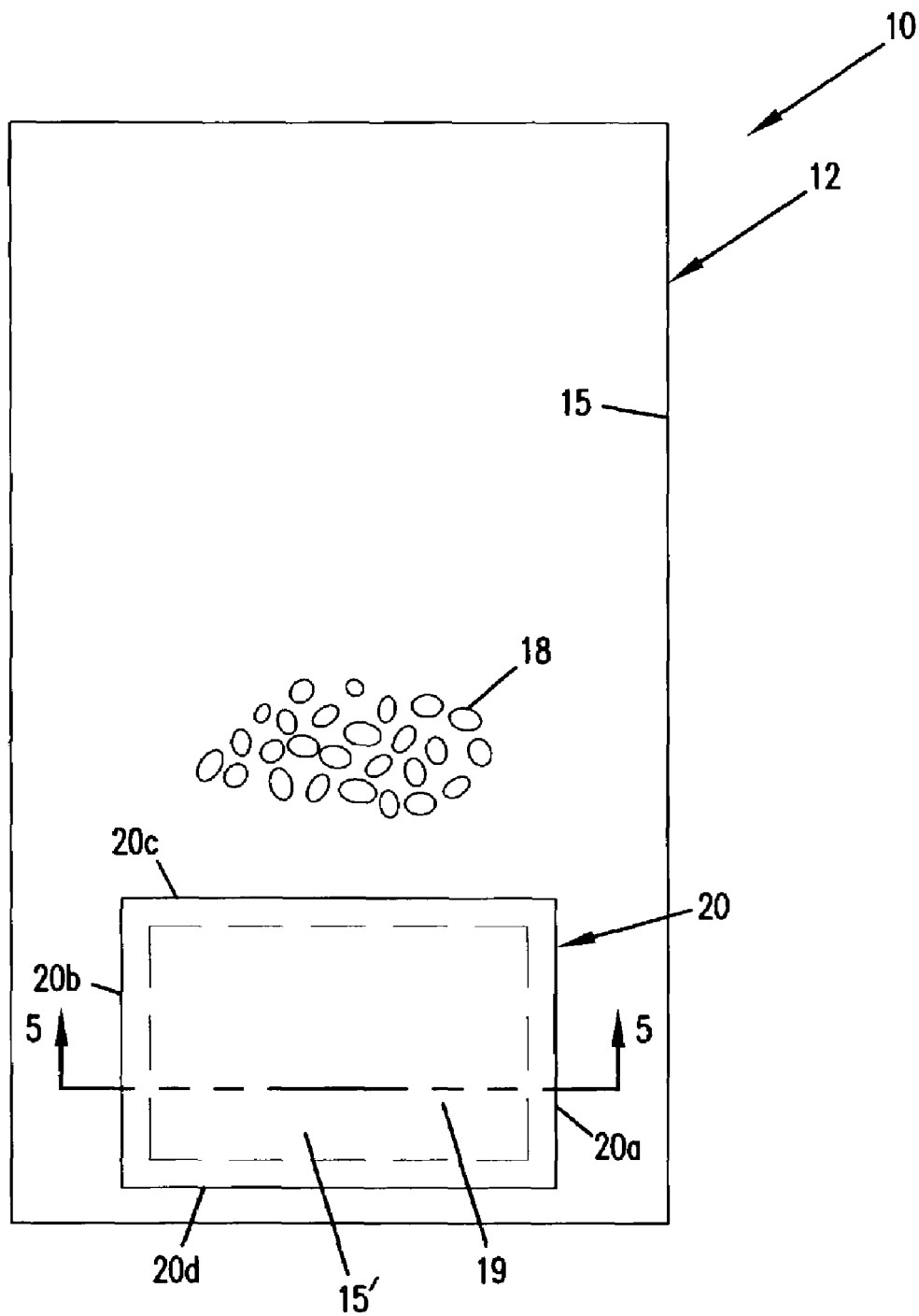

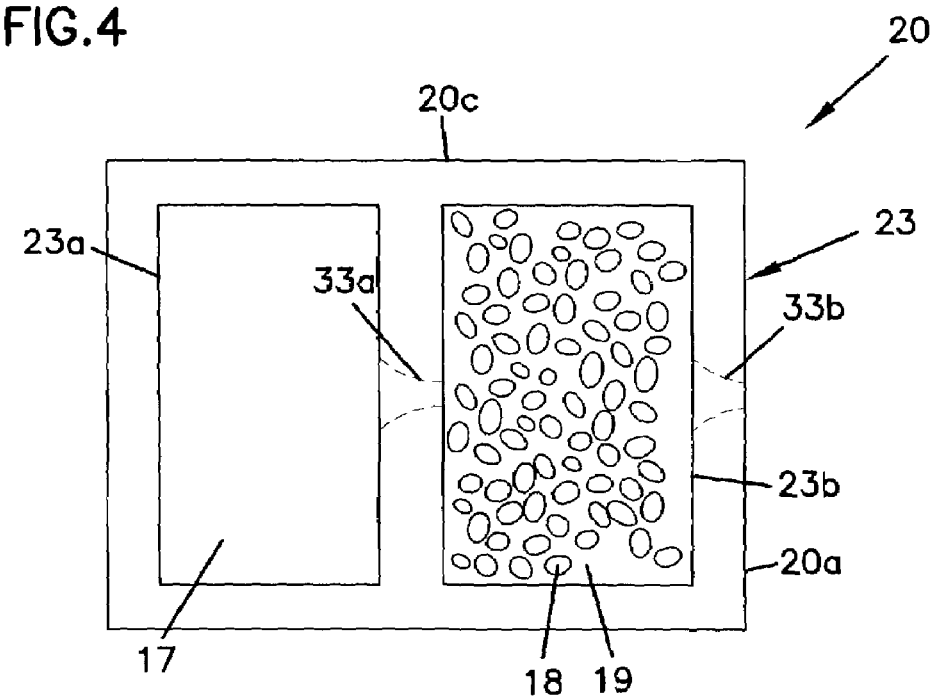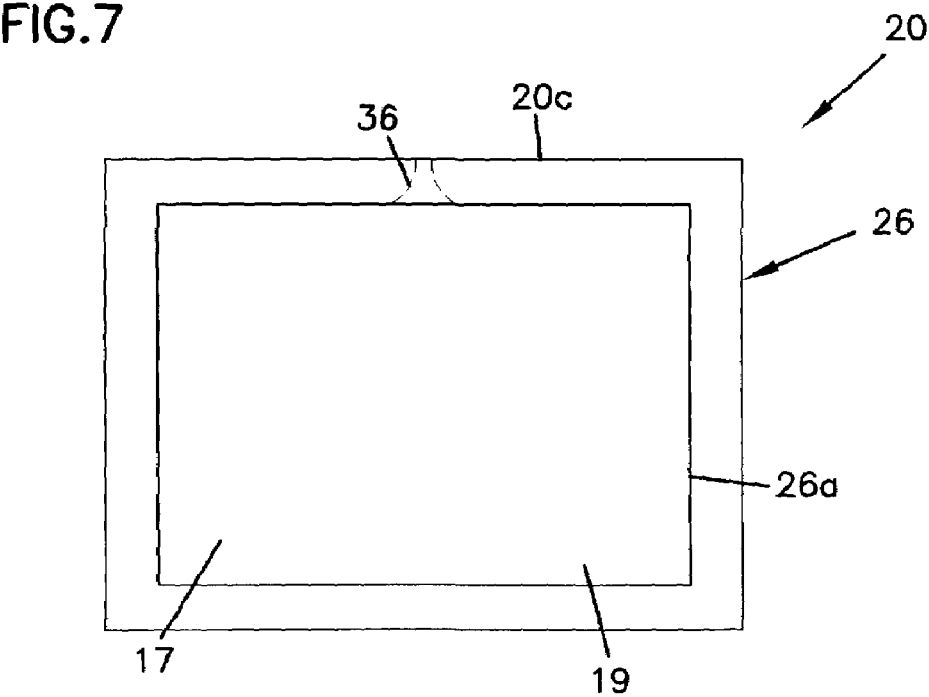

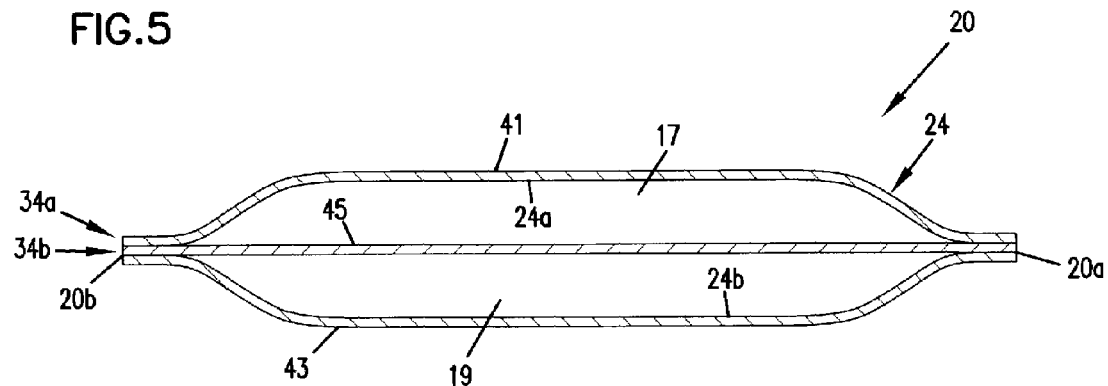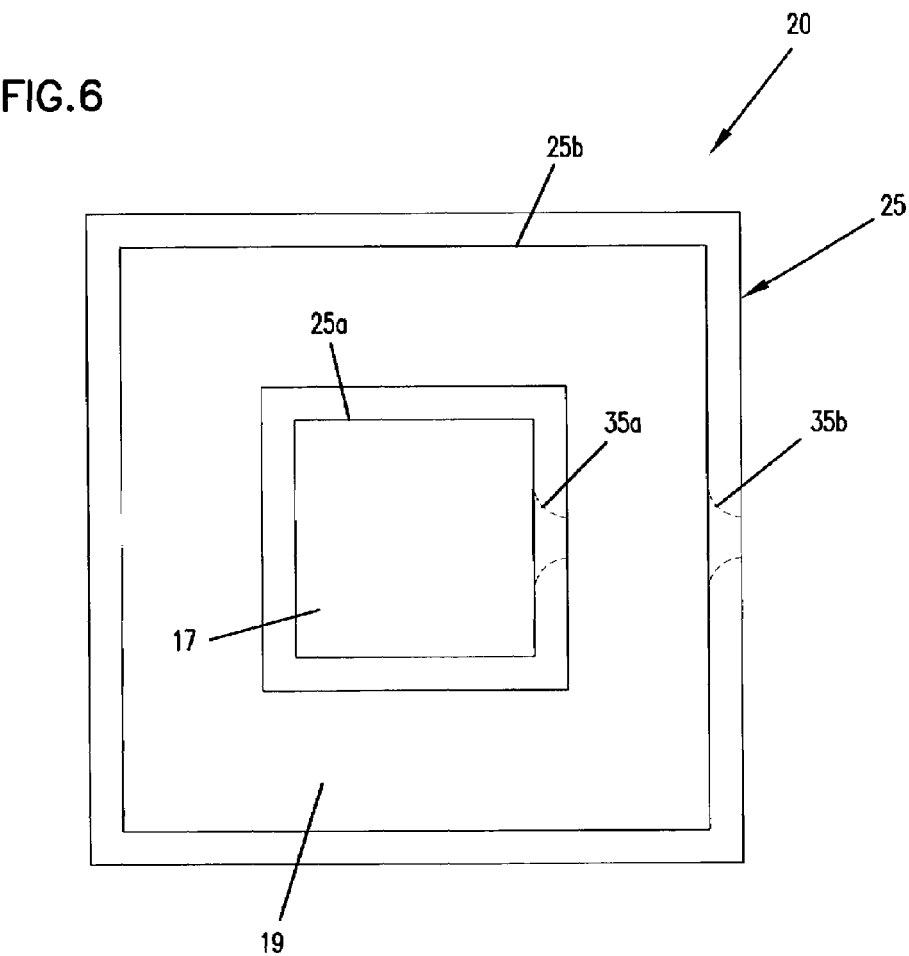

MICROWAVE POPCORN PACKAGE

FIELD OF THE INVENTION

The present invention relates to popcorn products and microwave product packaging. In particular, the invention relates to packages for popcorn products that include an outer package, a popcorn composition within the outer package, and an internal containment package positioned within the external package, the internal containment package configured to retain at least a portion of the popcorn composition.

BACKGROUND

Microwave popcorn popping packages, such as flexible bags, are common. A common feature of such bags is that they are generally made from paper materials that are sufficiently flexible to open or expand conveniently under steam pressure, which forms when a popcorn charge therein is exposed to microwave energy in a microwave oven. Also, the packaging materials are sufficiently flexible to be formed from a sheet into a folded configuration, for example during a continuous bag-construction process. Popcorn popping bags of this type are described, for example, in U.S. Pat. Nos. 5,044,777; 5,081,330; 5,195,829; 6,049,072; and 6,396,036 each of these being incorporated herein by reference. Popcorn popping bags are also described in U.S. Pat. Nos. 4,904,488; 4,973,810; and 4,982,064.

Many microwave popcorn products include a charge of unpopped popcorn kernels, fat/oil (i.e., grease) and flavoring (for example, salt) within the package. During storage or shipment, especially if the environment becomes relatively hot, the material stored within the bag can liquefy and leak through the bag construction. To inhibit such leakage, solid fat/oil products having a relatively high melting or softening temperature (typically at least about 90-115° F.) are used. Additionally or alternatively, some bags are made from expensive materials, such as two ply papers, glassine paper, or papers having a greaseproof coating thereon.

Improvements in microwave popcorn packaging are desired.

SUMMARY OF THE INVENTION

In a first aspect of the present invention, a microwave popcorn product is provided, the product having a popcorn composition within an outer package. At least a portion of the popcorn composition is contained within an internal containment package positioned within the outer package. The internal containment package is particularly suited for containing and retaining any liquid or non-solid portion of the popcorn composition therein, that is, any liquid or non-solid components or ingredients. Contained within the internal containment package could also or alternatively be solid components or ingredients.

The internal containment package has an internal volume to contain at least a portion of the popcorn composition. The containment package is constructed to release the portion of the popcorn composition contained therein during the microwave heating process. Alternately, the containment package is constructed to be manually ruptured or burst prior to the microwave heating process. The containment package is constructed to retain liquid or semi-liquid components therein, reducing the need for the outer package to use grease-proof paper or other liquid-proof materials, and, additionally or alternatively, reducing the need for a package overwrap as a moisture barrier.

A preferred popcorn product includes at least a portion of the oil/fat component of the popcorn composition contained within the internal containment package. By containing the oil/fat component within the containment package, liquid or non-solid oils and/or fats can be used in the popcorn product.

In another aspect of the invention, a low-trans fat or no-trans fat microwave popcorn product, typically having a liquid oil/fat component is provided, the liquid oil/fat component being contained and retained within the internal containment package, which is positioned in an outer package.

Another preferred microwave popcorn product, according to the present application, a flexible microwavable bag configured for expansion and an edible composition within the bag. The edible composition comprises unpopped popcorn kernels and an oil/fat component. The oil/fat component can include a liquid or non-solid component. An internal containment package is positioned within the expandable bag, with at least a portion of the edible composition contained within the containment package; the internal containment package is constructed and arranged, due to the increase of pressure therein during a microwave heating process, to burst and release the portion of the edible composition contained therein.

Still another preferred microwave popcorn product, according to the present application, comprises a package having a microwave interactive susceptor; and an edible charge having a low trans-fat level, the charge comprising unpopped popcorn kernels and an oil/fat component.

Yet another preferred microwave popcorn product comprises a rigid microwavable tub and an edible composition within the tub. The edible composition comprises unpopped popcorn kernels and an oil/fat component, which, at room temperature, has a liquid portion. Positioned within the tub is an internal containment package with at least a portion of the oil/fat component contained within the containment package, the internal containment package constructed and arranged, due to the increase of pressure therein during a microwave heating process, to burst and release the popcorn composition contained therein.

Methods of popping a microwave popcorn product are also disclosed, one preferred method comprising exposing a popcorn product to microwave energy, the popcorn product including an expansion source, increasing the expansion source in volume by exposure to microwave energy and bursting a containment package to release an oil/fat component and the expansion source present within the containment package, and popping the popcorn. The popcorn product includes an expandable package and an internal containment package within the expandable package. The internal containment package is constructed and arranged, due to the increase of pressure therein during a microwave heating process, to burst and release its contents.

BRIEF DESCRIPTION OF THE DRAWINGS

FIG. 1 is a schematic top view of a microwaveable popcorn product according to the present invention, the product having a composition including unpopped popcorn kernels within a package and a containment package within the package;

FIG. 4 is a schematic top view of a fifth embodiment of the containment package of FIG. 1;

FIG. 5 is a schematic cross-sectional view of a sixth embodiment of the containment package of FIG. 1, taken along line 5-5 of FIG. 1;

FIG. 6 is a schematic top view of a seventh embodiment of the containment package of FIG. 1;

FIG. 7 is a schematic top view of an eighth embodiment of the containment package of FIG. 1;

DETAILED DESCRIPTION OF THE INVENTION

Figure 1A:
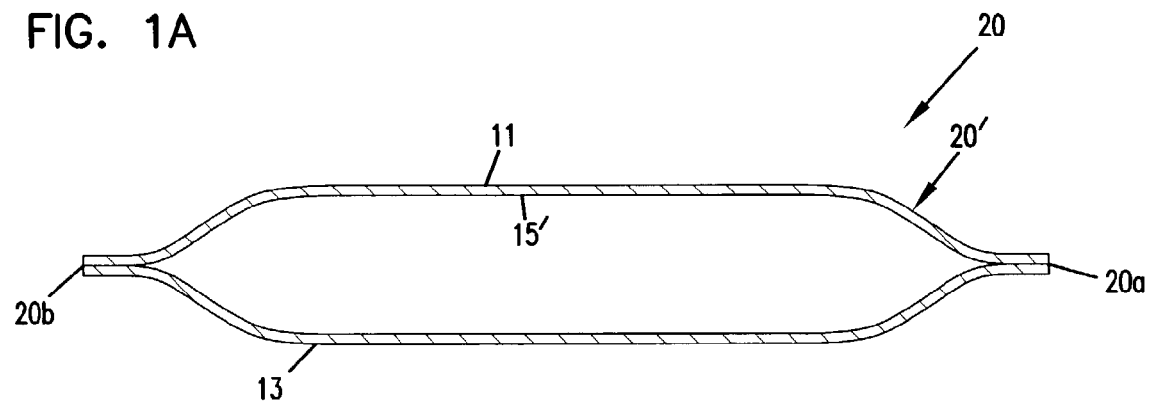
FIG. 1A is a schematic cross-sectional view of a first embodiment of the containment package of FIG. 1, taken along line 5-5 of FIG. 1.

As indicated above, the present disclosure concerns a popcorn product that includes an outer package and a popcorn composition within the package, the composition including unpopped, popcorn kernels, an oil/fat component, and optional flavoring. The present disclosure provides an internal containment package, positioned within the outer package, in which is contained at least a portion of the popcorn composition.

Referring now to the Figures, a first package configuration is provided. FIG. 1 schematically illustrates a popcorn product 10 that includes an outer package 12 having an interior 15. Within interior 15 is the popcorn composition, which includes but is not limited to unpopped popcorn kernels 18 and an oil/fat component 19. Popcorn product 10 includes an internal containment package 20 within outer package 12; at least a portion of the popcorn composition is present within internal containment package 20. Preferably and typically, at least any ingredients of the popcorn composition that are liquid or semi-liquid at typical room temperature are contained within containment package 20. Solid ingredients may or may not be contained within containment package 20. In FIG. 1, oil/fat component 19 is illustrated within package 20.

The Internal Containment Package

Internal containment package 20 is a package for retaining and containing ingredients or components of the popcorn composition prior to a microwave heating process. Specifically, package 20 is a pouch, vial, container, or other such package that has an internal volume. Package 20, particularly internal volume 15', is constructed to contain and retain a portion of the popcorn composition therein. Preferably, package 10, particularly volume 15', is constructed to contain and retain liquid, semi-liquid, or non-solid ingredients or components. Internal containment package 20 is non-vented, that is, prior to package 20 bursting, there is preferably little or no exchange of air or moisture from package 20, other than on a microscopic or atomic level.

Internal containment package 20 at least inhibits leakage of fluids therethrough or therefrom; that is, package 20 as a whole, including any side panels, side walls, seals or seams, inhibits leakage. Preferably, package 20, as a whole, is impermeable to liquid leaking therethrough or therefrom. By use of the term "impermeable to liquid leaking", and variations thereof, what is intended is that over a normal product life (generally, a 2 year period) no more than 10% of the total edible material retained by package 20 leaves package 20, either by evaporation, leakage, seepage, etc.

FIG. 1 illustrates a generic internal containment package 20. The containment package 20 of FIG. 1 is illustrated with side edges 20a, 20b, 20c, and 20d. It should be understood that an internal containment package 20, in accordance with the present disclosure, is not required to have side edges as illustrated in FIG. 1. Rather, FIG. 1 is a generic depiction illustrate internal containment package 20 within interior 15 of outer package 12. Internal containment package 20 could have a square area, circular, triangular, hexagonal, or any such area. Various constructions and configurations of internal containment package 20 are described below.

A first construction of containment package 20 is a flexible, generally flat pouch. FIG. 1A illustrates a cross-sectional view of a flexible, generally flat pouch, which represents internal containment package 20 of FIG. 1 taken along line 5-5 of FIG. 1. This containment package 20, specifically, internal containment package 20', is formed from a first sidewall 11 and a second sidewall 13, which defines interior volume 15' of containment package 20'. Sidewalls 11, 13 are sealed together at edges 20a, 20b. This seal may be made by any suitable means, including heat-sealing, ultrasonic sealing, and by the use of an adhesive. In a variation, package 20' can have a fold present at one of edges 20a, 20b and can be sealed together at the other one of edges 20a, 20b. At least one of edges 20a, 20b, 20c, 20d includes a region that will burst or release during microwave heating, so that the contents within interior volume 15' are released. This release or burst region is further described below.

Examples of suitable materials for sidewalls 11, 13 of internal containment package 20 include polymeric film (e.g., polyethylene, polypropylene, cellophane, mylar, silicon-oxide coated films, aluminum-oxide coated films, polyester, and nylon), metal foil, metallized polymeric film, treated papers, and laminated products thereof. The material should be such that leak-proof seals can be made between sidewalls 11, 13. One preferred material for sidewalls 11, 13 is 150 gauge OL film commercially available from DuPont Teijin Films. These materials, and the resulting containment package 20', are fairly flexible. Additional details regarding internal containment package 20', and methods of making package 20', are provided below.

Figure 1B:
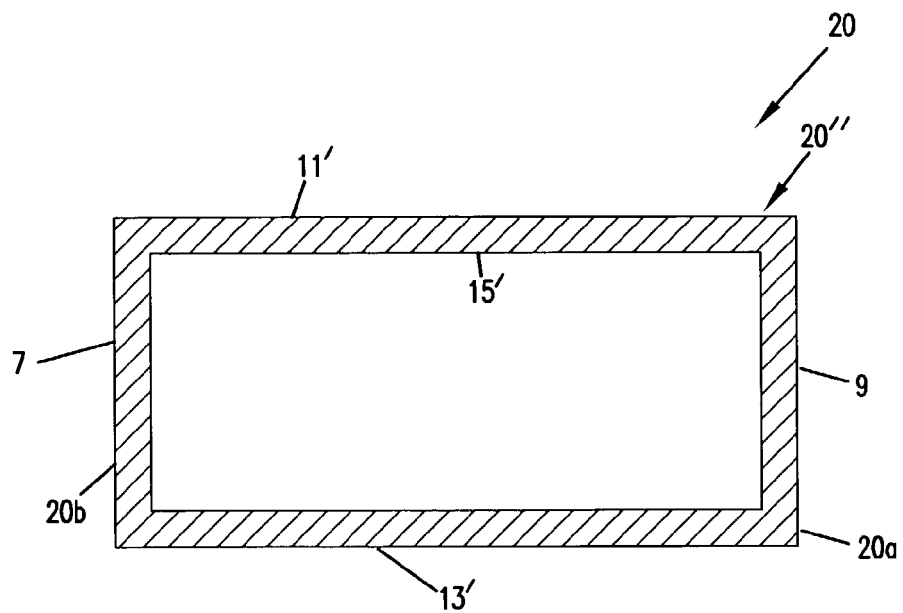
FIG. 1B is a schematic cross-sectional view of a second embodiment of the containment package of FIG. 1, taken along line 5-5 of FIG. 1.

A second construction of containment package 20 is a fairly rigid container, having a measurable length, width and thickness. FIG. 1B illustrates a cross-sectional side view of a rigid, generally three-dimensional containment package 20", which represents internal containment package 20 of FIG. 1, taken along line 5-5 of FIG. 1. This containment package 20, specifically, internal containment package 20", is formed from a topwall 11', a base 13', a first edge wall 7 at edge 20a and a second edge wall 9 at edge 20b, which together define internal volume 15' of containment package 10". Internal containment package 20" can be cylindrical, cubic, block-like, spherical or semi-spherical, or have any other three dimensional shape. Internal containment package 20" is typically made from less flexible, more rigid materials than the flexible, polymeric materials disclosed above for containment package 20'. Examples of suitable materials for containment package 20" include wax, cellulose, gelatin, and the like. Preferably these materials are non-toxic and are food-grade. Internal containment package 20" is particularly suitable as a manual-burst containment package.

Containment package 20 (whether containment package 20' or containment package 20") is positioned inside package 12. Internal containment package 20 can be attached or secured to an interior surface, such as a side panel or an end seam of package 12. An adhesive can be used to secure package 20 to an interior surface. Additionally or alternately, package 20 can be sealed or attached into an end or side seam of package 12 during manufacture of package 12. Alternately, package 20 can be unattached to an interior surface of outer package 12. An internal package 20 that is initially unattached or unsecured to interior 15 of outer package 12 could include a heat activated adhesive thereon, so that during microwave heating, internal package 20 would adhere to interior 15.

Containment package 20 is preferably positioned in close proximity to popcorn kernels 18, and preferably the entire containment package 20 is within interior 15, although in some designs a portion of containment package 20 may be present on the exterior of package 15.

As stated above, containment package 20 can contain and retain any or all of unpopped popcorn kernels 18, oil/fat component 19, flavors, additives, and any other component of the popcorn composition.

Popcorn Kernels

Unpopped popcorn kernels 18 are any hulled or dehulled popcorn kernel known for use in microwave popcorn products. The kernels may be large, medium, small, white, yellow, flavored, or any type of available kernel. Usually, the popcorn kernels have an internal moisture level of about 11-16%.

Oil/Fat Component

Oil/fat component 19 facilitates the even distribution of heat to popcorn kernels 18 prior to and during popping of kernels 18. Oil/fat component 19 further facilitates the distribution of flavor among popcorn kernels 18 by splashing, pouring, spraying, blowing or otherwise distributing itself and any flavor over the popped popcorn flakes. Oil/fat component 19, when present in the popcorn composition, is generally a separable component from kernels 18. That is, oil/fat component 19 is not appreciably absorbed by or present within the interior of kernels 18.

Oil/fat component 19 refers to materials that are primarily tri-fatty acid esters of glycerol. Fat is a natural lipid material that is mainly solid at room temperature. Oil is similar to fat, but is liquid at room temperature. The term "oil/fat component" is meant to refer to oil(s), fat(s) (natural or modified) and any mixtures thereof. The "oil/fat component" may be a solid, liquid, or semi-solid at room temperature. Many forms of oil/fat component 19 are substantially solid at room temperature prior to the popping process, and readily melt during the microwave popcorn popping process. When the terms "liquid", "semi-solid", "non-solid" and other such terms are used, what is intended is an oil/fat component which, at room temperature, is flowable and does not hold a third dimensional shape if not retained by a mold or other structure for one hour. That is, a liquid, semi-solid or non-solid oil/fat component 19 will slump or otherwise loose a formed shape within one hour.

Preferred oils for use in oil/fat component 19 include non-hydrogenated and/or partially hydrogenated vegetable oils. Suitable oils include those obtained from sunflower oil, safflower oil, rapeseed oil, cottonseed oil, maize oil, linseed oil, groundnut oil, and soybean oil. Other suitable oils include nut oils (such as almond, brazil nut, cashew, coconut, hazelnut, pecan, peanut, and walnut), olive oil, palm oil, sesame oil, and flaxseed oil. Non-fat oils, such as olestra (e.g., commercially available under the trade name Olean) are also suitable for use.

The amount of oil/fat 19 within popcorn product 10, in relation to the unpopped popcorn kernels, is no more than about 50 wt-%, and is typically no more than about 40 wt-%. The amount of oil/fat 19 is usually at least 1 wt-% and typically at least 5 wt-%.

Flavorants

Popcorn product 10 of the present invention can include any suitable type of flavorant or flavoring, depending on the specific characteristics and/or flavor the final product is to have. In typical applications, product 10 will include various flavorants, colorants and other adjuvants in the popcorn composition. Typical components that might be included in the popcorn composition are salt and butter flavor. Other suitable flavors include sweet, sour, sugary, savory, tart, spicy, fruity or any other flavor. Examples of specific flavors include, but are not limited to: butter, cheese(s), sour cream & chive, dill, herb, onion, garlic, jalapeno, bacon, pizza, tomato, salt & vinegar, barbecue, taco, cinnamon, nutmeg, hickory and smoke. The flavorants may be present as a liquid or a solid, and may be contained within a cell of internal containment package 20 or be external to internal containment package 20 within interior 15 of outer package 12. It should be understood that the amount of flavorant present in the popcorn composition prior to popping and in the popped product will largely depend on the specific flavorant used.

Expansion Source

In one design of containment package 20, in order to release the ingredients or components contained within package 20, containment package 20 includes an expansion source therein that bursts or opens package 20. This expansion source is generally a moisture source such as liquid water, although moisture present in other ingredients, such as the unpopped popcorn 18, is also suitable. An amount of moisture or other expansion source is desired within containment package 20 in order to burst or otherwise penetrate containment package 20. Most oil/fat compositions do not appreciably expand in volume during microwave heating, however, emulsions or other oil/fat components that include water therein, such as a margarine emulsion, will release water upon heating, allowing steam to expand and burst containment.

Water expands at least about 1200 times the volume (at the same pressure) as it heats from room temperature (about 20° C.) to its boiling temperature (100° C.).

The moisture source present within internal containment package 20 sufficiently expands to burst package 20 usually within about 15-45 seconds after the initiation of microwave energy from a conventional residential microwave oven, usually 800-1200 watts. It is preferred that internal containment package 20 bursts prior to popcorn 18 popping.

Figure 8:
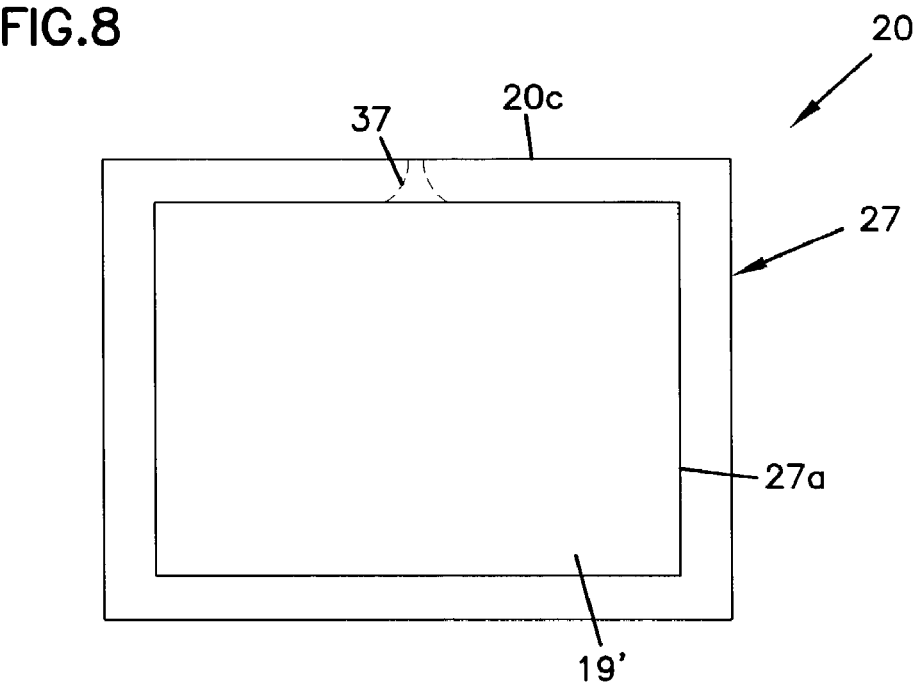
FIG. 8 is a schematic top view of a ninth embodiment of the containment package of FIG. 1.
Figure 9:
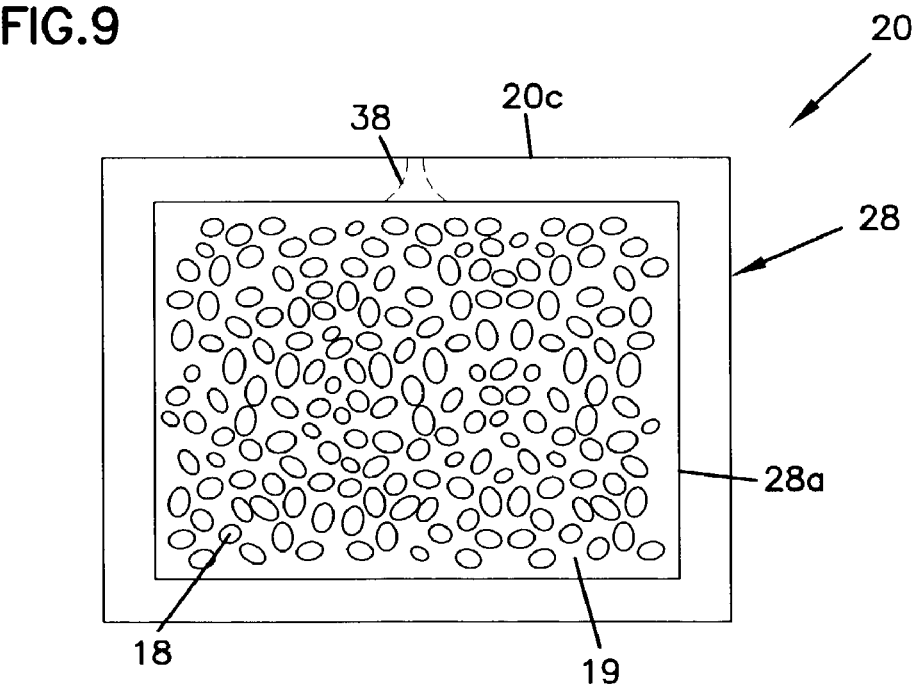
FIG. 9 is a schematic top view of a tenth embodiment of the containment package of FIG. 1.

Referring to FIGS. 2 through 9, various embodiments of containment package 20 are illustrated. FIGS. 2 through 6 illustrate multiple cell or multiple chamber containment packages and FIGS. 7 through 9 illustrate single cell or chamber containment packages. The embodiments illustrated in FIGS. 2 through 9 are generally flexible, fairly flat packages, made from polymeric film; these embodiments are similar to containment package 20' in FIG. 1A.

Multiple Cell

Figure 2:
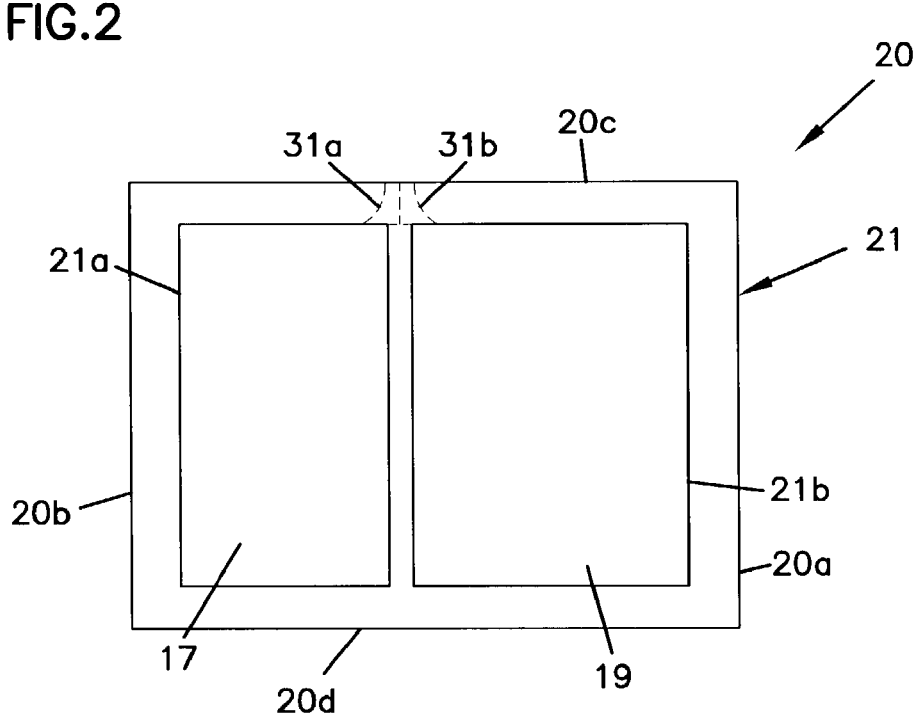
FIG. 2 is a schematic top view of a third embodiment of the containment package of FIG. 1.

Containment package 20 of FIG. 2 is specifically containment package 21 having a first cell 21a and a second cell 21b. First cell 21a retains an expansion source, water 17, and optionally but preferably salt, and second cell 21b retains oil/fat 19.

Figure 3:
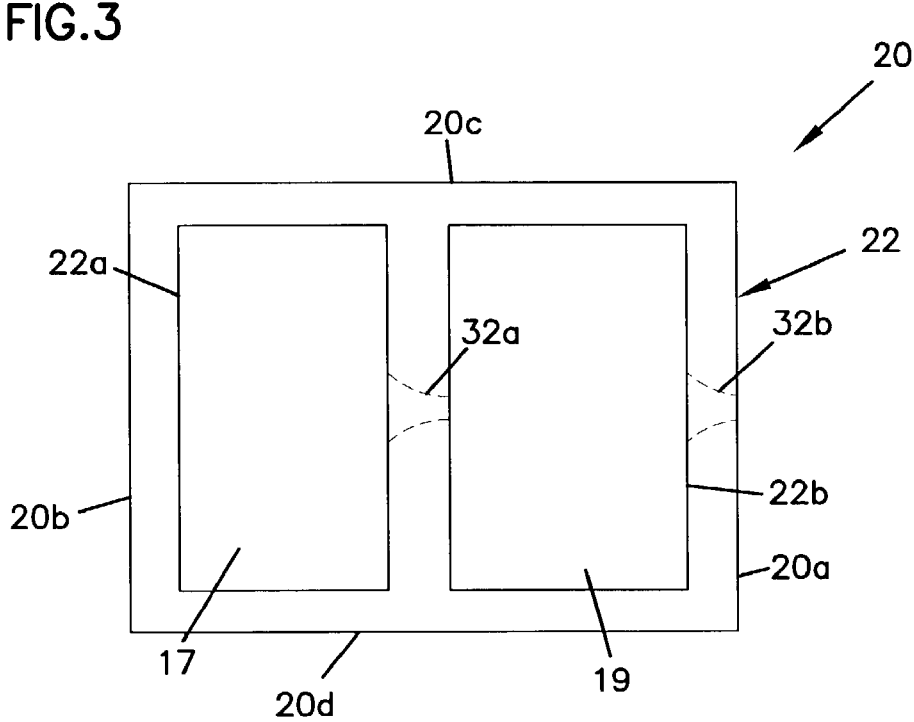
FIG. 3 is a schematic top view of a fourth embodiment of the containment package of FIG. 1.

Containment package 20 of FIG. 3 is specifically containment package 22 having a first cell 22a and a second cell 22b. Similar to containment package 21 of FIG. 2, first cell 22a of FIG. 3 retains a volume of water 17, and optionally but preferably salt, and second cell 22b retains oil/fat 19.

Packages 21, 22 differ in that containment package 21 of FIG. 2 is constructed so that each of first cell 21a and second cell 21b individually bursts/through a side edge of package 21. First cell 21a has a first burst region 31a and second cell 21b has a second burst region 31b. Each of burst regions 31a, 31b extends from cells 21a, 21b, respectively, and, when burst or otherwise ruptured, provides a passage from cell 21a, 21b to the exterior of containment package 21 through side edge 20c. In the embodiment of FIG. 2, increased pressure within cell 21a will burst both regions 31a and 31b.

Burst regions 31a, 31b, and all others described herein, are regions within containment package 20 that are a weakness or other structure of package 20 designed to burst upon the build-up of pressure within the cell and release the pressure from the interior 15'. The burst region may be a weaker seal at a side edge, such as at edge 20c, a perforated area, a slit, a notch, or other such structure that weakens the structure and creates a weak point.

In package 22 illustrated in FIG. 3, first cell 22a has a first burst region 32a and second cell 22b has a second burst region 32b. Unlike the configuration of package 21 of FIG. 2, burst region 32a is designed so that the contents of first cell 22a, water 17, bursts into second cell 22b. The mix of water 17 and oil/fat 19 then bursts from second cell 22b via region 32b through side edge 20a. The rupturing of first burst region 32a and second burst region 32b may be simultaneous or sequential.

As discussed above, containment package 21 of FIG. 2 and containment package 22 of FIG. 3 include expansion source water 17, and optionally but preferably salt, in first cell 21a, 22a and oil/fat 19 in second cell 21b, 22b. Popcorn product 10, such as that illustrated in FIG. 1, that incorporates either of package 21 or package 22 would include a charge of popcorn 18 in volume 15 external to package 21, 22. Thus, during the microwave heating of a popcorn product having either package 21 or package 22, containment package 21, 22 would burst, providing oil/fat 19 to cover popcorn 18 and facilitate its popping. Water 17 is typically released as steam from containment package 21, 22, although some liquid water 17 may be splashed onto popcorn 18.

Another embodiment of a multiple cell containment package 20 is illustrated in FIG. 4. Specifically, FIG. 4 shows a containment package 23 having a first cell 23a and a second cell 23b. Containment package 23 has a first burst region 33a extending from first cell 23a to second cell 23b, and a second burst region 33b extending from second cell 23b to side wall 20a.

Similar to containment package 22 of FIG. 3, first cell 23a of FIG. 4 retains water 17, and optionally but preferably salt, therein, and second cell 23b retains oil/fat 19 therein. Second cell 23b additional includes a charge of popcorn 18 therein. In alternate constructions, popcorn 18, with or without some amount of oil/fat 19, may instead be present in first cell 23a, with additional oil/fat 19 in second cell 23b. In such a construction, the moisture within popcorn 18 provides the moisture needed to rupture first cell 23a. Additional popcorn 18 may or may not be present within interior 15 of package 12.

FIG. 5 illustrates a variation of multiple cell containment packages 21, 22 and 23 described above. FIG. 5 illustrates a multiple cell containment package often referred to as a "sandwich" containment package. That is, rather than the first cell and the second cell being positioned next to each other, as in packages 21, 22 and 23, in the embodiments of FIG. 5, the first cell and second cell are stacked. Additional details are found below and in conjunction with FIG. 5.

Specifically, containment package 20 of FIG. 5 is a containment package 24 having a first cell 24a and a second cell 24b. First cell 24a contains water 17, and optionally and preferably salt, and second cell 24b contains oil/fat 19.

First cell 24a and second cell 24b are defined by cell walls 41, 43 and 45; specifically, first cell 24a is defined by walls 41 and 45 and second cell 24b is defined by walls 43 and 45. Walls 41, 43, 45 meet and are sealed at edges 20a and 20b. Containment package 24 has a first burst region 34a extending from first cell 24a and a second burst region 34b extending from second cell 24b. Each burst region 34a, 34b, located at edge 20b, is designed to burst or release between the respective cell walls. That is, first burst region 34a will burst the seal between walls 41 and 45, and second burst region 34b will burst the seal between walls 43 and 45. Burst regions 34a, 34b are similar to burst regions 31a, 31b, in that the regions are structured so that the build-up of pressure within cell 24a will burst both regions 34a and 34b.

In FIG. 6, yet another variation of a multiple cell containment package 20 is illustrated, specifically internal containment package 25 having a first cell 25a within a second cell 25b. First cell 25a may be free-floating or unsecured within second cell 25b, or first cell 25a may be fixed or secured within second cell 25b. A secured first cell 25a can share a side wall with second cell 25b. First cell 25a, positioned within second cell 25b, contains water 17 and optionally and preferably salt, and second cell 25b contains oil/fat 19. First cell 25a has first burst region 35a, and second cell 25b has second burst region 35b. Build up of pressure within first cell 25a will cause burst region 35a to release, thus increasing pressure in second cell 25b and thus causing burst region 35b to break. Second burst region 35b may rupture simultaneously with or subsequent to first burst region 35a.

Single Cell

Referring now to FIGS. 7 through 9, containment packages 20 having a single cell or chamber are illustrated. Specifically, FIG. 7 shows containment package 26, FIG. 8 shows containment package 27, and FIG. 9 shows containment package 28. Similar to containment packages 21, 22, 23, 24 and 25, described above, containment packages 26, 27 and 28 of FIGS. 7-9 retain oil/fat 19 and a moisture source, except, however, containment packages 26, 27 and 28 of FIGS. 7-9 have a single cell for retaining both the oil/fat and the moisture source.

Containment package 26 of FIG. 7 has cell 26a which retains water 17 and optionally but preferably salt, and oil/fat 19 therein. A burst region 36 extends from cell 26a to side edge 20c. Water 17 may be intimately mixed with oil/fat 19, for example, as an emulsion. In most constructions, water 17 and oil/fat 19 are non-miscible, and an emulsion is preferred.

In a variation of containment package 26, oil/fat 19 can be present within cell 26a with no water 17 present therein. With no expansion source present, cell 26a will typically not rupture without intervention, which can be provided by the consumer. That is, immediately prior to placing the popcorn package in the microwave oven, the consumer can manually rupture the containment package 26, for example by hand pressure, to release oil/fat 19. It is understood that any containment package 20 can be manually ruptured if desired.

Containment package 27 of FIG. 8 is similar to the illustrated containment package 26 of FIG. 7 in that it has a cell 27a and a burst region 37 extending from cell 27a to side edge 20c, except that package 27 of FIG. 8 retains a modified oil/fat product 19', such as an emulsion, which incorporates in it a moisture source. There is no liquid water within cell 27a.

Likewise, containment package 28 of FIG. 9 is similar to package 26 of FIG. 8 by having a cell 28a and a burst region 38 extended from cell 28a to side edge 20c. Containment package 28 includes no liquid water within cell 28a; instead, cell 28a retains oil/fat 19 and a charge of popcorn kernels 18. Popcorn 18 within cell 28a provides sufficient moisture to have cell 28a expand and burst.

The various containment packages 20 illustrated and described above provide a secure location for ingredients that are usually liquid or otherwise flowable at usual room temperatures, so that the liquid does not leak or otherwise cause a mess. Ingredients that are usually liquid at room temperatures include fats and oils. Although only water 17, popcorn 18 and oil/fat 19, have been described as being present within containment package 20, flavorants or other adjuvants could also be retained and contained within package 20, particularly any liquid flavorants or other adjuvants.

Expansion Source Revisited

As described above, it is desired to have an expansion source present to facilitate opening or bursting of containment package 20 to release fat/oil 19 retained inside. Typically, this expansion source is a moisture source, such as liquid water.

The amount of moisture is such so that the volume increase in the moisture caused by microwave heating is sufficient to burst or otherwise break the seal or the burst region on the cell in which water 17 or other moisture source is contained. It is understood that the specific amount of moisture will depend on the size of the cell, the presence of other elements within the cell, elements such as oil/fat 19, popcorn 18, flavorants, and even air. For preferred popcorn products having about 99 grams of edible components, about 1-2 grams of saline water (having 6.25% wt-NaCl) as expansion source are used.

For a multiple cell containment package 20, where oil/fat 19 and water 17 are contained separately, the amount of water 17, as a ratio to oil/fat 19, is at least 1:250. The amount of water 17, as a ratio to oil/fat 19 is no greater than 1:5, and often no greater than 1:6.25. Typically the ratio of water 17 to oil/fat 19 is 1:50 to 1:15. A ratio of 1:16.7 water:oil/fat is one preferred ratio.

For a single cell containment package 20, where the oil/fat 19 and water 17 are present in the same cell, the ratio of water 17 to oil/fat 19 is at least 1:250. The amount of water 17, as a ratio to oil/fat 19 is no greater than 1:5, and often no greater than 1:6.25. Typically the ratio of water 17 to oil/fat 19 is 1:50 to 1:15. A ratio of 1:16.7 water:oil/fat is one preferred ratio.

For embodiments having a modified oil/fat 19' such as an emulsion of water in oil/fat, the amount of water 17 in oil/fat 19' is at least 0.05% by weight; the amount of water in oil/fat 19' is generally no greater than 25% by weight. In some embodiments, it is possible to use a "reversed-emulsion", having oil/fat dispersed within an aqueous solution, and thus having more than 25% by weight water content.

In the "manual burst" package 20 described above, an embodiment of which is illustrated in FIG. 1B as internal containment package 20", no moisture would be necessary to release oil/fat 19, as package 20 is ruptured manually by the consumer or by other physical means. If the manual burst package 20 is generally flexible application of pressure for example rolling the palm of the hand is usually sufficient to burst package 20. A rigid manual burst package 20 could be manually snapped or cracked.

The unpopped popcorn kernels 18 are also a good source of moisture. Popcorn kernels 18 usually have a moisture content of about 11-16%; depending on the amount of popcorn 18 and the size of the cell, the expansion of this moisture is generally sufficient to burst the seal on the cell.

Vaporization of the water, and thus steam, can be generated more quickly by the addition of salt to the water. By use of the term "salt", what is intended is edible anionic salts of chloride and iodide, most commonly sodium chloride. It is preferred to have some salt present in water 17. If present, the amount of salt added to the water is typically at least 0.5 part per 100 parts water, to make about a 0.5% saline solution . Typically, the amount of salt added to the water is no greater than about 15 parts salt per 100 parts water (about a 13% saline solution) and more typically, the amount of salt added to the water is not greater than about 10 parts per 100 parts water (about a 9% saline solution). A suitable and common range of saltwater includes 1:100 to 5:100 (about 1% saline to about 5% saline). The salt added to the water will provide some degree of flavoring to the popped popcorn. However in most cases, additional salt will be present in other locations within product 10, such as with fat/oil 19 or with popcorn kernels 18.

The salt used is typically sodium chloride (common table salt or sea salt), although other salts such as potassium chloride, potassium iodide, sodium iodide, calcium chloride, may be suitable. Any size of salt may be used. Common sizes of salt include those known as table salt or flour salt.

The following table provides a definition of preferred popcorn compositions, prior to being popped, based on the entire edible product.

| Ingredient | Typical wt-% | Preferred wt-% | Most Preferred wt-% | One Example grams |
|---|---|---|---|---|
| Unpopped popcorn kernels | ≧50 wt-% | 60-85 wt-% | 64-70 wt-% | 69.5 grams |
| Oil/Fat | ≦50 wt-% | ≦30 wt-% | 24-30 wt-% | 27.05 grams |
| Saline solution (6.25 wt-% NaCl*) | 0.1-10 wt-% | 0.5-5 wt-% | 1-2 wt % | 1 gram |
| Other Flavorants | ≦5 wt-% | ≦3 wt-% | | 2.75 grams |

*The 6.25 wt-% saline solution was made by combining 15 grams water with 1 gram NaCl.

No or Low Trans-Fat Popcorn Product

As stated, containment package 20 provides a suitable and convenient package for retaining and containing any and all liquid ingredients or components of the popcorn composition. Many oil/fats 19, particularly those having no-trans fat or low-levels of trans fat, are liquid at room temperature. Trans-fat is also commonly referred to as "trans-fatty acids" or variations thereof. Examples of oils and/or fats that can be considered to be trans-fat free or low-trans fat include sunflower oil, canola oil, corn oil, olive oil, soy oil, peanut oil, palm oil, and coconut oil.

Because typical trans-fat free oils/fats are liquid or non-solid at room temperature, the trans-fat free oils/fats are preferably retained within containment package 20 as oil/fat 19 or as oil/fat 19'. The popcorn product of the present invention could include a source of oil/fat that is not contained within containment package 20, but is present within interior 15 of package 12. Typically, any oil/fat present outside of containment package 20 is solid or semi-solid at room temperature.

For this application, a popcorn product having "no trans-fat" or being "trans-fat free" has no more than 5 grams of trans-fat per 100 grams of edible product. A product having "low trans-fat" has no more than 10 grams of trans-fat per 100 grams of edible product.

In a preferred product configuration, the entire edible component, including oil/fat 19 within package 20 and any other oil/fat, includes no more than 5 wt-% of trans-fat, preferably no more than 1.5 wt-% of trans-fat. Any trans-fat may be present within containment package 20, either in the same cell as the no trans-fat or low trans-fat or in a separate cell, or, a trans-fat may be present outside of package 20. It may be desirable to add an amount of trans-fat, such as partially hydrogenated soybean oil, to the popcorn product, for example, to modify the taste of the popped product, to contain additional salt and/or flavors, or to retain a product load on the susceptor. It is preferred, however, that the amount of trans-fat is no more than about 10 wt-% of the entire oil/fat component, preferably no more than about 5 wt-%.

The following table provides a definition of preferred no trans-fat or low trans-fat popcorn compositions, prior to being popped, based on the entire edible product.

| Ingredient | Typical wt-% | Preferred wt-% | Most Preferred wt-% | One Example grams |
|---|---|---|---|---|
| Unpopped popcorn kernels | ≧50 wt-% | 60-85 wt-% | 64-70 | 69.5 grams |
| Trans-fat Free Oil/Fat | <50 wt-% | ≦30 wt-% | 24-30 wt-% | 24.8 grams |
| Trans Oil/Fat | ≦5 wt-% | ≦2 wt-% | ≦1.5 wt-%, even more pref. ≦1 wt-% | 1.5 grams |
| Saline solution (6.25 wt-% NaCl*) | 0.1-10 wt-% | 0.5-5 wt-% | 2-5 wt % | 1 gram |
| Other Flavorants | ≦5 wt-% | ≦3 wt-% | | 2.75 grams |

*The 6.25 wt-% saline solution was made by combining 15 grams water with 1 gram NaCl.

The Containment Package, Revisited

Returning to containment package 20, as described above, package 20 is a mechanism for providing a retainer, receptacle, or other container to retain liquid components, such as oil/fat 19, including no or low trans-fat substance oil/fat 19, so that under typical storage and usage conditions of popcorn product 10, these liquid components do not leak from product 10.

Typically, containment package 20 is a fairly two dimensional or flat pouch, made from a material that inhibits water 17, oil/fat 19, and any other ingredients or components from seeping therethrough, preferably, eliminates seeping therethrough. Examples of suitable materials for package 20 include polymeric film (e.g., polyethylene, polypropylene, mylar, silicon oxide coated films, aluminum-oxide coated films, other metallized films, polyester, nylon, or other poly resin materials), metal foil, treated papers, and laminated products thereof. The material should be such that leak-proof seals can be made between plies of the material. Examples of suitable sealing methods include adhesives, heat sealing (e.g., sealing under heat and pressure), or ultrasonic sealing.

Containment package 20 can be made by any number of methods. One preferred method for making package 20 is to overlap two sheets of material, such as polymeric material, heat seal three sides (e.g., side edges 20a, 20b, 20d of FIG. 1) and any internal seals between cells, fill the cell(s), and seal the last side (e.g., side edge 20c). Another preferred method is to fold a sheet of polymeric material, the fold forming a first side, such as side edge 20d, heat sealing side edges 20a, 20b and any internal seals, filling the cell(s), and sealing side edge 20c. Yet another method is to use a tube of material (the tube forming side edges 20a, 20b), sealing side edge 20d and any internal seals, filling the cell(s), and sealing side edge 20c.

The overall size of containment package 20 should be such that adequately retains the cell(s) and provides an adequate seal around the cell(s). For example, for some packages 20, a heat seal ⅝ inch thick (about 1.6 cm thick) is provided on all sides of package 20.

The size of the containment package 20 cells should be adequate to contain the amount of oil/fat 19, water 17, popcorn 18, and any other ingredients that might be retained within package 20. For a dual cell package, such as packages 21, 22, 23 of FIGS. 2, 3 and 4, each cell typically has a volume of at least 2 cm$^3$, prior to expansion. The specific volume of the cell depends on its contents. For example, if 22 grams of oil/fat 19 are retained in a cell, the cell volume is preferably about 25 to 60 cm$^3$. For 1.5 grams of water or saline 17, the cell volume is preferably about 2 to 20 cm$^3$. If popcorn 18 is present within the cell, the cell should be sufficiently large to retain all of the popcorn 18, oil/fat 19, and other ingredients.

Containment package 20 preferably includes burst region 31a, 31b, 32a, 32b, etc., as described above. These burst regions may be a weakness in the seal between or around the cells, or may be a notch, slit, perforation, or other weakness formed within the seal. The function of the burst region is to direct where package 20 will burst. It should be understood that the burst region could be positioned in any side edge of package 20. An example of a suitable burst region is a triangular notch cut into the seal. A slit in the seal is also suitable as a burst region. Usually, the distance that the burst region extends into the seal is no more than 90% of the width of the seal, typically no more than about 75%. Preferably, at least 0.25 inch of the seal is left without a burst region. The burst region depth or length could be a low as 0.062 inch.

A popcorn composition and containment package 20, with at least a portion of the popcorn composition retained within package 20, is positioned within a package. In the embodiment illustrated in FIG. 1, unpopped popcorn kernels 18 are present in interior 15 outside of package 20 and oil/fat is present within containment package 20. Package 12 can be any type of suitable microwave popcorn package such as an expandable bag or a tub. Containment package 20 is positioned within interior 15 of package 12, positioned to minimize interference with expansion of package 12 during microwave heating. Preferably, package 20 is attached or secured to package 12 rather than freely positioned within interior 15. By use of the terms "attached", "secured", or the like, what is intended is that at least a portion of the internal containment package 20 is fixed to and immovable in respect to interior 15 of outer package 12. The terms "unattached", "unsecured", freely positioned" and the like, are intended to mean that the internal containment package is movable in respect to interior 15 of outer package 12.

Additionally, containment package 20 is preferably positioned, whether secured or unsecured, in package 12 so that popcorn 18 is positioned in close proximity to any microwave interactive susceptor in package 12. Depending on the specific construction of package 20 and the components therein, typically, popcorn 18 is between the susceptor and containment package 20, although in embodiments such as a single cell internal containment package having popcorn kernels 18 therein, popcorn 18 may not be between the susceptor and internal containment package 20, but will be within package 20, as described above. It should be understood that internal containment package 20 could be positioned anywhere in interior 15 of outer package 12.

Containment package 20 is typically attached to package 12 during the production of package 12. Examples of specific, suitable packages 12 are described below.

Packages for Popcorn Products

As discussed above, the unpopped, microwaveable popcorn composition is provided in package 12 to form popcorn product 10. In general, such a package can be an expandable, flexibe bag, such as in accord with U.S. Pat. Nos. 5,044,777 (Watkins et al.), 5,690,853 (Jackson et al.), 5,650,084 (Bley) or. 6,049,072 (Olson et al.), or a rigid tub, such as in accord with U.S. Pat. Nos. 5,008,024 (Watkins) or 5,834,046 (Turpin et al.), each of these which is incorporated herein by reference. In typical preferred packages, the microwave package contains a microwave interactive construction or susceptor, to enhance the popping operation. Such susceptors are described for example in U.S. Pat. Nos. 5,149,396 (Wilson); 5,175,031 (Ochocki) 5,338,911 (Brandenberg et al.); and 5,285,040 (Brandenberg et al.), all incorporated herein by reference.

Figure 10:
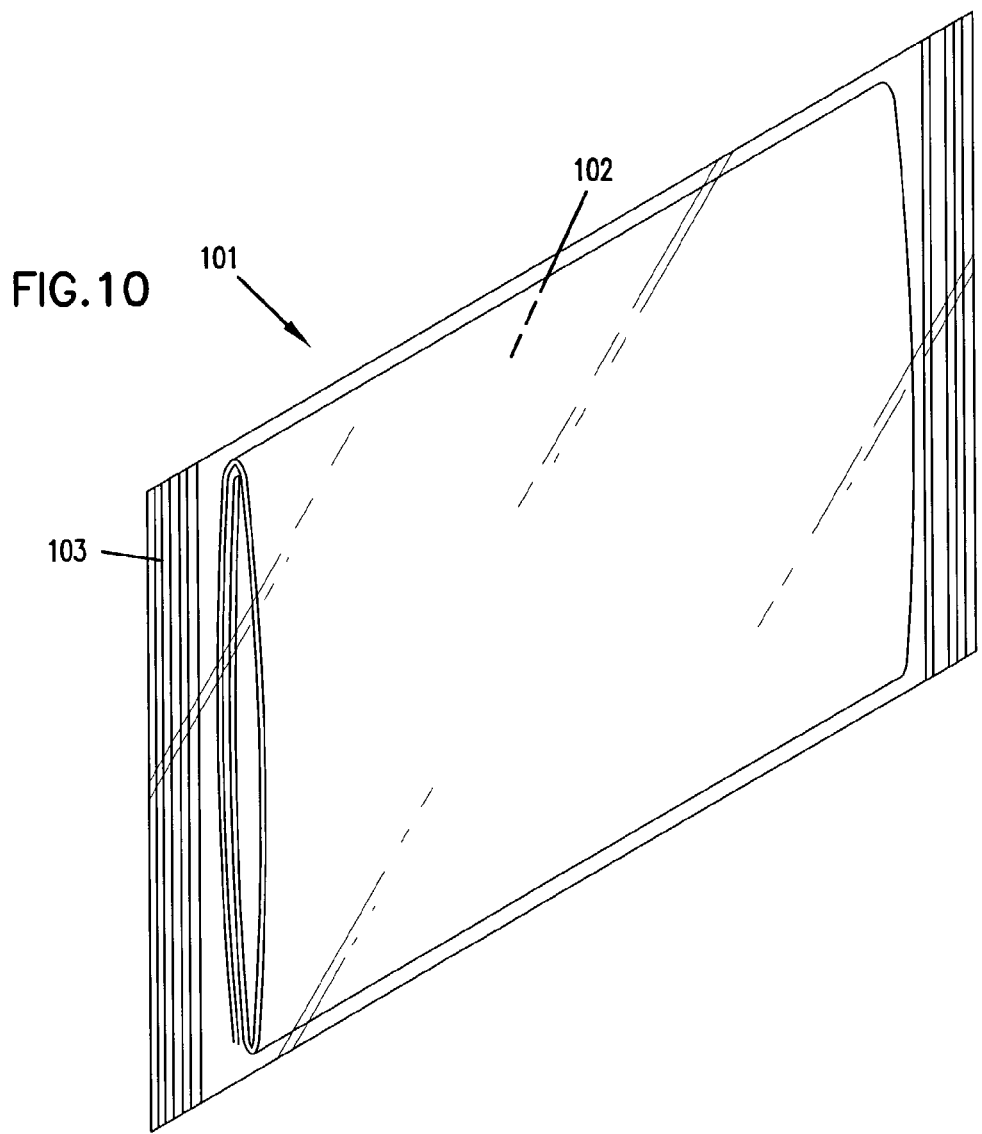
FIG. 10 is a front perspective view of a package being depicted closed in a storage overwrap and oriented standing on an edge.
Figure 11:
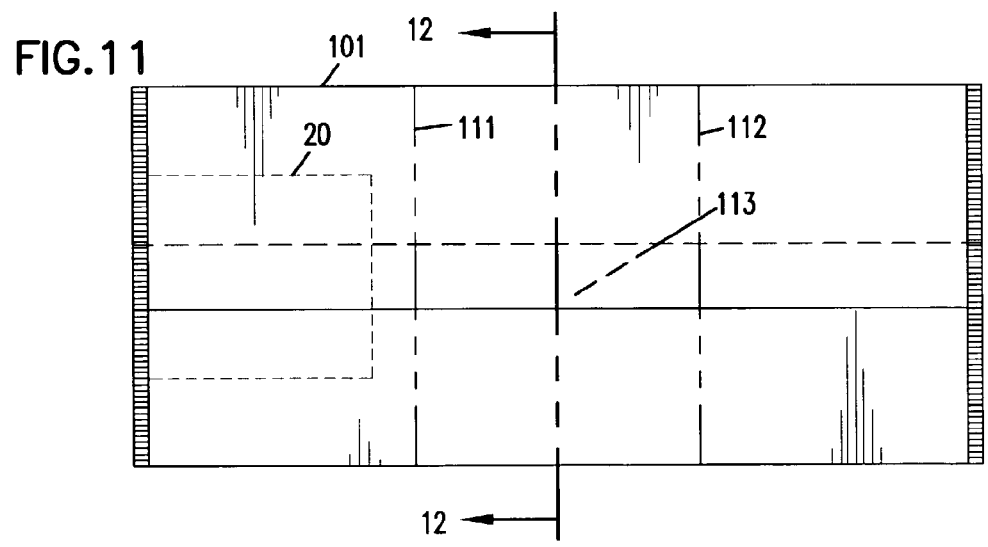
FIG. 11 is a schematic top plan view of the package of FIG. 10 showing a positioning of a containment package according to the present disclosure, depicted unwrapped and unfolded, as it would be when positioned in a microwave oven for cooking.

Attention is now directed to FIGS. 10-14. In FIG. 10, a flexible microwave popcorn bag 101 is depicted stored or oriented substantially vertically. Bag 101 is depicted in a trifold configuration 102, included with an overwrap 103 for storage. In FIG. 11, a top plan view of popcorn bag 101 is shown schematically in an unfolded configuration and oriented much as it would be when positioned in a microwave oven for popping of the popcorn charge contained therein, but before expansion of the package. The term "flexible" is meant to refer to a bag and bag material which is not so stiff or rigid as to undesirably interfere with bag expansion during use. Alternately stated, the term is used to refer to a bag that can be readily folded and unfolded.

In FIG. 11, lines 111 and 112 indicate fold lines which define central region 113 of the arrangement. Inside the bag in central region 113, unpopped popcorn 18 and containment package 20 would generally be positioned in orientation above a portion of the bag in which a microwave interactive construction (susceptor) is positioned. The term "microwave interactive" is meant to refer to a material that becomes hot upon exposure to microwave energy in a microwave oven. Typical microwave interactive constructions comprise a metallized polymeric component (for example, aluminized products) positioned in bag 101.

During the popping operation, any expansion source, such as water, absorbs microwave energy and expands, thus bursting the cell(s) of containment package 20 and releasing oil/fat 19. This moisture also generates sufficient steam and heat for popping and for expansion of bag 101. In addition, the microwave interactive material also absorbs microwave energy and dissipates heat to the popcorn composition.

Figure 12:
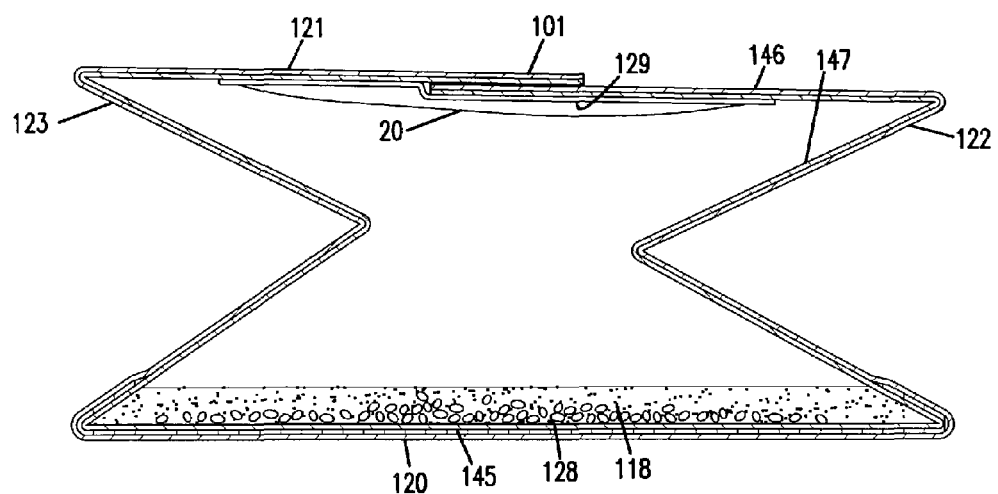
FIG. 12 is a cross-sectional view taken generally along line 12-12, FIG. 11.

Attention is now directed to FIG. 12, a cross-section taken generally along line 12-12 of FIG. 11. In FIG. 12 it can be seen that bag 101 generally comprises a double wall (or two-ply 146, 147) configuration defining first and second opposite panels 120 and 121 joined by first and second side gussets 122 and 123. Gussets 122 and 123 generally separate popcorn bag 101 into first and second expandable tubes 128 and 129. Popcorn charge 118 is substantially positioned and substantially retained within tube 128. Underneath popcorn charge 118, bag 101 includes a microwave interactive construction or susceptor 145. In certain arrangements, such as the one shown in FIG. 10, susceptor 145 is positioned between plies 146, 147 from which flexible bag 101 is folded. Containment package 20 is positioned within expandable tube 129, preferably adhered to ply 147. Thus, the construction shown in FIG. 12 has popcorn charge 118 positioned between susceptor 145 and containment package 20.

Figure 13A:
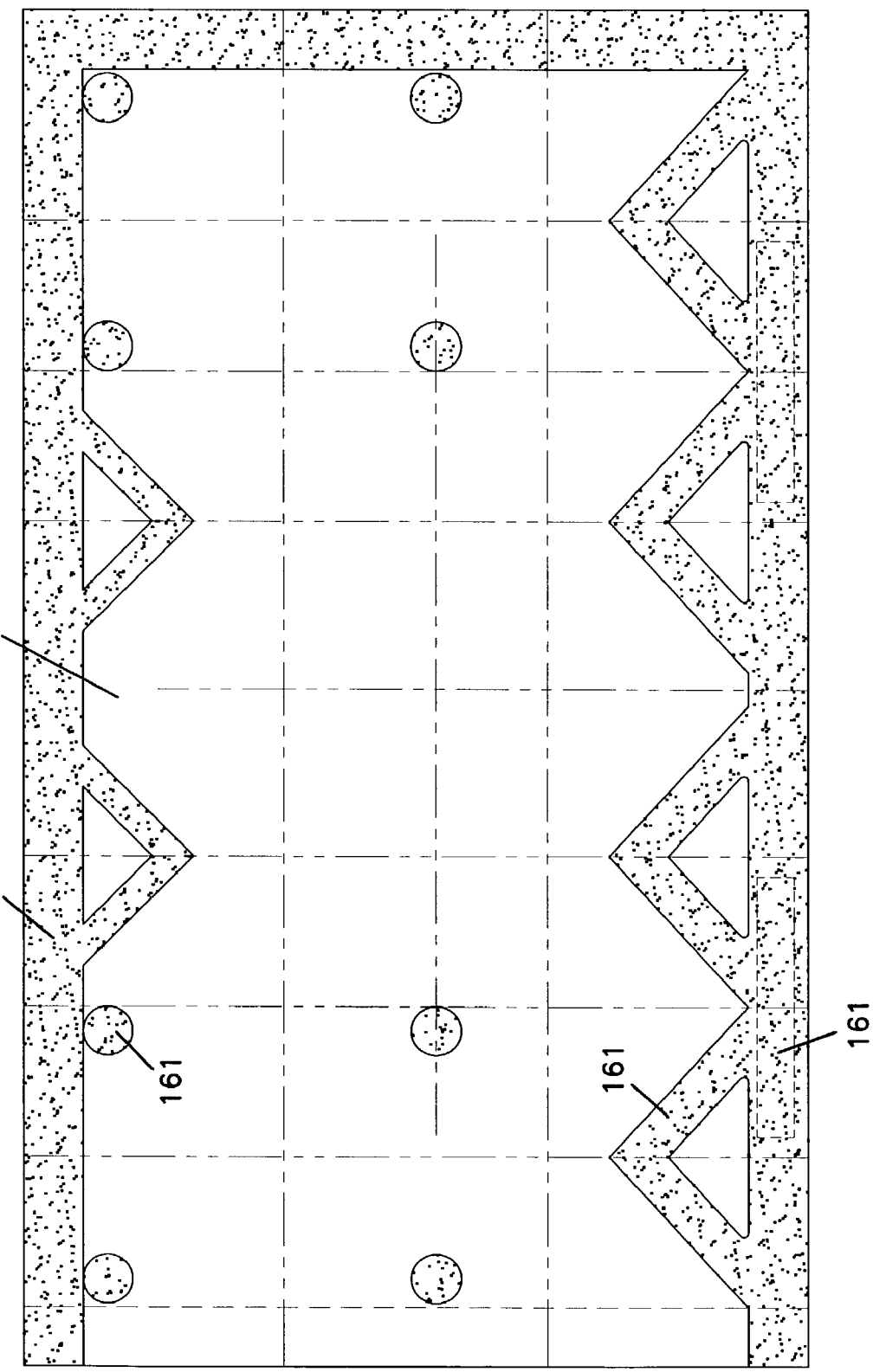
FIG. 13A is a schematic, plan view of a package blank showing an adhesive pattern on a first side of the blank, the adhesive used to generate a package of the arrangement of FIGS. 10-12.

In FIG. 13A, a panel 160 is shown; panel 160 is a blank or sheet of flexible material from which bag 101 is folded. Panel 160 includes various sealant fields 161, 162, 163 thereon, shown in dot pattern, which provide desired features in the resulting folded bag 101. Sealant fields 161, 162 provide a package, as is described in U.S. Pat. No. 5,650,084, having end gussets. Sealant field 163 is used to adhere a microwave susceptor to panel 160. In one embodiment, this sealant field 163 is about 6.5 inches by 5.625 inches.

Figure 13B:
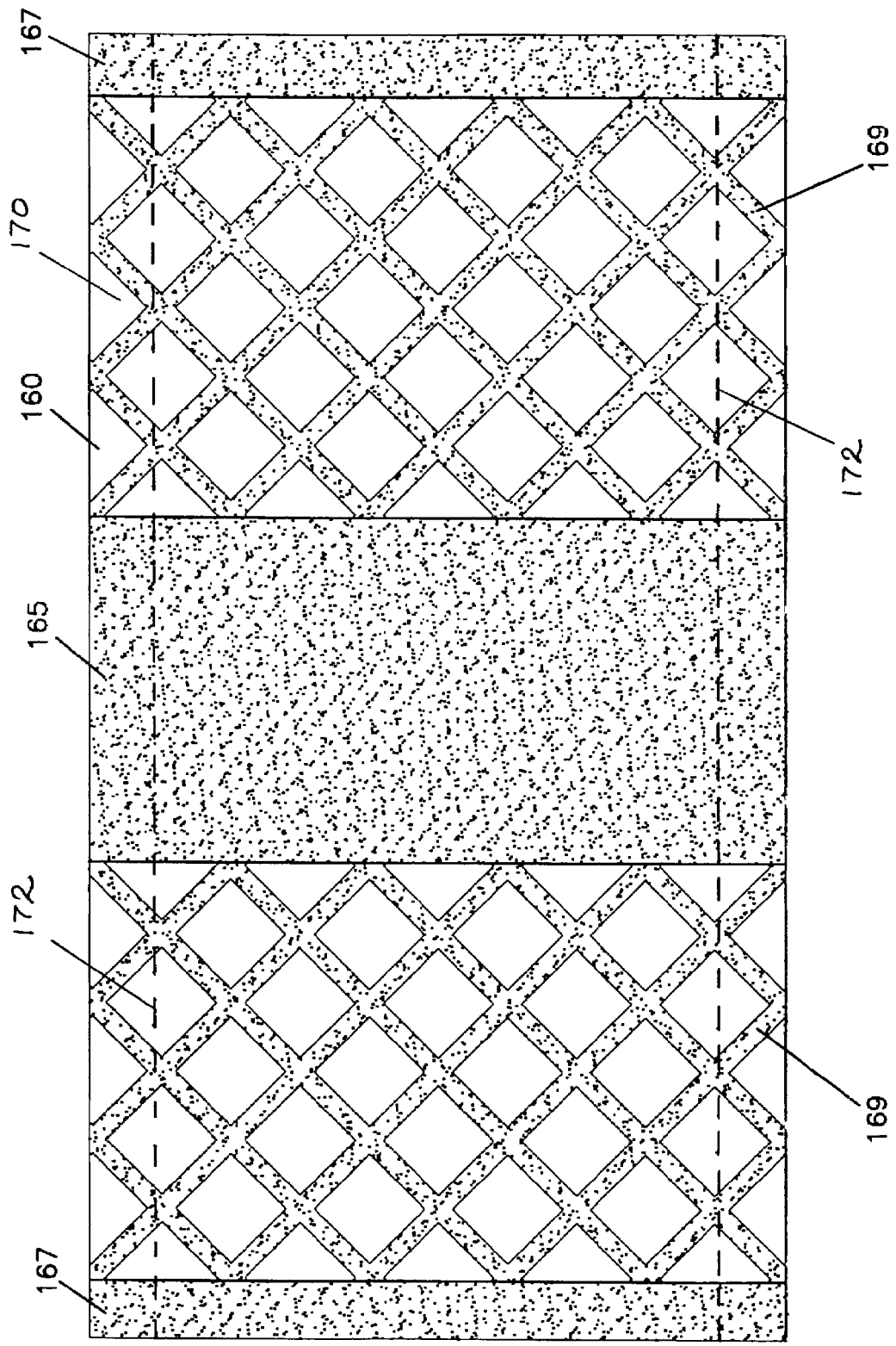
FIG. 13B is a schematic, plan view of the package blank showing an adhesive pattern between two plies of material, the adhesive used to laminate the two plies together for the arrangement of FIGS. 10-12.

Panel 160 is typically formed from two plies of paper laminated together, as illustrated in FIG. 12 with plies 146, 147. A preferred lamination adhesive pattern is illustrated in FIG. 13B on panel 160; it should be understood that the adhesive pattern illustrated in FIG. 13B is present between two plies, which are then used to form panel 160 described above having sealant fields 161, 162, 163. Various sealant fields are present on panel 160 in FIG. 13B, particularly, sealant fields 165, 167, 169. Sealant field 165 is present at the center of panel 160 and includes a field of continuous coverage of adhesive. The microwave interactive susceptor is typically present within the area of field 165. Sealant fields 167, which also are areas of continuous coverage of adhesive, are present at the ends of panel 160. Sealant fields 169 include crossing lines of adhesive, having portions of panel 160 uncoated with adhesive. Approximately 55% of the surface of panel 160 is covered by adhesive.

An outside border 170, defined at least by sealant fields 167 and the area designated by broken lines 172, is positioned at the perimeter of panel 160. Border 170, in preferred arrangements, is about 0.625 to 1.125 inches wide. Outside border 170 comprises a region completely covered by adhesive. In the embodiment illustrated in FIG. 13B, the portion of sealant fields 167 within border 170 forms a region completely covered by adhesive. Additionally, the portion of sealant field 165 within border 170 forms a region completely covered by adhesive. The portion of sealant field 169 within border 170 forms a region having a contiguous region of adhesive.

Figure 14:
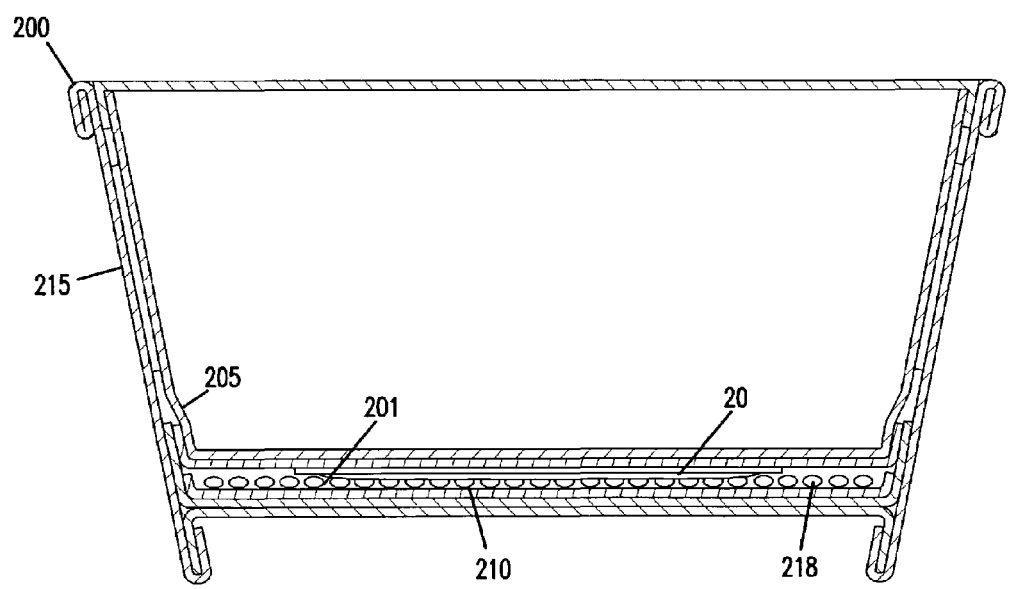
FIG. 14 is a schematic cross-sectional view of a fiberboard tub including a containment package according to the present disclosure.

In alternate embodiments, popcorn product 10 can have a rigid tub configuration, as for example shown schematically in FIG. 14 and characterized in U.S. Pat. No. 5,384,024, incorporated herein by reference. A cross-section of such a tub 200 is depicted in FIG. 14, containing popcorn charge 218, a microwave interactive susceptor 210, and internal containment package 20. Popcorn charge 218 is positioned in proximity to susceptor 210 and between susceptor 210 and containment package 20. Such tubs are generally made from a paperboard or fiberboard material, with a flexible film used for a cover. In general, with such arrangements, a cover 205 expands or balloons under the heat and steam produced during the popcorn popping operation. Containment package 20, in this embodiment, is attached to cover 205. Tub 200 has an inverted, rigid conical sidewall construction 215 that facilitates nesting and stacking, facilitates popping of charge 218, and provides a bowl after popping and opening/removal of cover 205.

The invention will be further described and illustrated in the examples which follow. The examples are illustrative of the invention and should not be construed as limiting the scope to their details. All parts, percentages, ratios, etc. are by weight unless otherwise specified.

EXAMPLE 1

Example 1 was a popcorn product incorporating a single cell containment pouch for containment of trans-fat free oil. Multiple (approximately 30) containment pouches were made and tested using the following materials and procedures. The materials used for Example 1 were as follows:

pre-made microwave popcorn bags (such as those shown in FIGS. 1-4 of U.S. Pat. No. 6,049,072, except having the adhesive pattern illustrated in FIG. 13A of this application and the lamination adhesive pattern illustrated in FIG. 13B)—unsealed at both ends;

150 gauge sealable "OL Mylar" film—10 inch wide rolls—commercially available from DuPont Teijin;

"Duracet" heat activated glue;

margarine type emulsion containing water, salt, and one or both of corn oil, and NuSun mid-oleic acid sunflower oil, the emulsion commercially available from various oil suppliers;

partially hydrogenated/winterized soybean oil, powdered salt, mesh size 200 (75 microns);

partially hydrogenated soybean oil; and un-popped kernels of microwave popcorn.

Containment pouches were made by cutting the mylar film into rectangular pieces measuring 5.0 inches×5.5 inches (12.7 cm×14 cm). Two pieces of the film were stacked on each other, with the sealant layer surfaces facing each other. The two width (shorter, 5.0 inch (12.7 cm)) sides and one of the length (longer, 5.5 inch (14 cm)) sides of the pieces of film were sealed with the heat sealer (model 12-ASL heat sealer from Sencorp Packages Inc). The seals were between about 0.5 inch (1.3 cm) and 0.625 inch (1.6 cm) wide. The sealer was set for 0.6 seconds, 240° F. (115° C.), and with a seal bar pressure of 80 PSI.

While holding the pouch open, 22.8 grams of the margarine-type emulsion were placed into the pouch; care was taken to not contaminate the fourth, future seal area with the emulsion. Next, the fourth seal on the pouch was made using the same technique as the other three seals. With a scissors, a 0.25 inch (0.64 cm) slit was made in the center of the last (length side) seal. A thin coating of Duracet heat activated glue was applied to both sides of the non-slitted length seal.

After the Duracet glue was dry, the containment pouch was inserted into the bottom end of the pre-made bag so that the long (5.5 inch (14 cm)) side of the pouch was parallel with the end of the bag. The side of the pouch with the slit was positioned towards the center of the bag, and the side with the Duracet was positioned near the bottom seal area of the bag. The containment pouch was positioned between the top layer of the bag (the side without the susceptor) and the gussets, with the edge of the pouch centered in the bottom seal area of the bag. The bag end was sealed with the heat sealer, thus sealing the containment pouch in its position. The sealer was set for 0.6 seconds, 300° F. (149° C.), and 80 PSI. This seal received two to three activations with the sealer.

The bag was folded about 5.5 inches (about 14 cm) from (and parallel to) the bottom seal of the bag that was just made. Holding the bag partially folded, with both ends up, 69.5 grams of corn kernels were poured into the bag through its top. Next, a mixture of 5 grams of partially hydrogenated soybean oil and 2 grams of powdered salt was added to the bag. The top of the bag was sealed with one activation of the heat sealer for 0.6 seconds at 300° F. (149° C.), and 80 PSI.

When cooked in a 1200 watt microwave, oven the containment pouch burst after approximately 19 to 35 seconds of exposure to microwave energy, the first popcorn kernel popped at about 40 to 58 seconds, the total pop time was from 1 minute 57 seconds to 2 minutes 17 seconds, and the pop volume averaged 3007 ml.

Comparative Example—Three bags of a commercially available popcorn product (Orville Redenbacher's Butter flavor) were popped. The first kernel popped at 46 seconds, the pop time averaged 1 minute 40 seconds, and the pop volume averaged 3150 ml.

EXAMPLE 2

Example 2 was a popcorn product incorporating a single cell containment pouch for containment of trans-fat free oil and popcorn kernels. Four containment pouches were made and tested using a similar procedure and the same materials as described in Example 1, except as noted.

Containment pouches, 5.0 inches×5.5 inches (12.7 cm×14 cm) were made by the same procedure as in Example 1. 69.5 grams of corn kernels were poured into the pouch. Next, 22.05 grams of liquid oil were added to the pouch; again, care was taken not to contaminate the seal area with the oil. The fourth and final seal was made using the same technique as previously. The seal was slit and the opposite side was glued.

The containment pouch was positioned and secured to a bag in the same manner as in Example 1. The bag was folded about 5.5 inches (about 14 cm) from (and parallel to) the bottom seal of the bag that was just made. Holding the bag partially folded, with both ends up, 5 grams of partially hydrogenated soybean oil and 2.75 grams of powdered salt were poured into the bag through its top. The bag was sealed as described above.

Two-week old bags were placed in a medium (1100 watt) wattage microwave oven. The average pop time was 2 minutes 30 seconds, and the average pop volume was 3088 ml. There was no off flavor, and there was no loss of crispiness of the popped corn.

The foregoing description, which has been disclosed by way of the above examples and discussion, addresses embodiments of the present disclosure encompassing the principles of the present invention. The embodiments may be changed, modified and/or implemented using various types of arrangements. Those skilled in the art will readily recognize various modifications and changes which may be made to the present invention without strictly following the exemplary embodiments and applications illustrated and described herein, and without departing from the scope of the present invention which is set forth in the following claims. All patents referred to herein are incorporated by reference herein in their entirety.

What is claimed is:

1. A microwave popcorn product comprising:
   (a) an outer flexible microwaveable expandable bag;
   (b) unpopped popcorn kernels within the expandable bag;
   (c) an internal containment package positioned within the expandable bag, the internal containment package having a first cell and a second cell, the first cell positioned within the second cell;
   (d) said first cell containing substantially only a liquid component, said liquid component consisting essentially of free water and salt contained with the first cell in an amount sufficient to burst the first cell, and then the second cell, upon microwave heating of said expandable bag with said internal containment package contained therein; and
   (e) an oil/fat component contained within the second cell external to the first cell; the internal containment package constructed and arranged, due to the increase of pressure therein during a microwave heating process, to burst, and release the oil/fat component contained therein, into said expandable bag;
   wherein the internal containment package is disposed in a position substantially adjacent to the unpopped popcorn kernels, at least a portion of which are external to the containment package, and
   wherein the internal containment package is unattached to a surface of the expandable bag.

2. The popcorn product according to claim 1, wherein the unpopped popcorn kernels are present external to the containment package.

3. The popcorn product according to claim 2, wherein the oil/fat component comprises a trans-fat free oil/fat.

4. The popcorn product according to claim 3, wherein the oil/fat component comprises the trans-fat free oil/fat and a trans oil/fat, the trans-fat free oil/fat being contained in the containment package and the trans oil/fat being present in the expandable package external to the containment package.

5. The popcorn product according to claim 4, wherein the trans oil/fat comprises no more than 10 wt-% of the oil/fat component.

6. The popcorn product according to claim 5, wherein the trans oil/fat comprises no more than 5 wt-% of the oil/fat component.

7. The popcorn product according to claim 4, wherein the popcorn kernels are present in the expandable bag external to the containment package.

8. The popcorn product according to claim 7, wherein all the popcorn kernels are present external to the containment package.

9. The popcorn product according to claim 1, wherein the salt and water are present as a saline solution of no more than about 13% salt.

10. The method of claim 1, wherein an outer surface of said internal containment package comprises a heat activated adhesive; said internal containment package arranged to adhere to an inside surface of said expandable bag upon microwave heating of said expandable bag.

11. A microwave popcorn product comprising:
   (a) an outer microwaveable, expandable package;
   (b) unpopped popcorn kernels within the expandable package;
   (c) an internal containment package positioned within the expandable package, the internal containment package having a first cell and a second cell, the first cell positioned within the second cell;
   (d) said first cell containing substantially only a liquid component, said liquid component consisting essentially of free water and salt contained within the first cell, said liquid component being present in an amount sufficient to burst the first cell, and then the second cell, upon microwave heating of said expandable package with said internal containment package contained therein; and (e) an oil/fat component contained within the second cell external to the first cell; the internal containment package constructed and arranged, due to the increase of pressure therein during a microwave heating process, to burst and release the oil/fat component contained therein into said expandable package;

wherein the internal containment package is disposed in a position substantially adjacent to the unpopped popcorn kernels, at least a portion of which are external to the containment package; and wherein the internal containment package is unattached to a surface of the expandable package.

12. The popcorn product according to claim 11, wherein the microwaveable package is a flexible microwaveable bag configured for expansion.

13. The popcorn product according to claim 11, wherein the oil/fat component comprises a trans-fat free oil/fat.

14. The method of claim 11, wherein an outer surface of said internal containment package comprises a heat activated adhesive; said internal containment package arranged to adhere to an inside surface of said expandable bag upon microwave heating of said expandable bag.

15. A microwave popcorn product comprising:

(a) an outer flexible microwaveable expandable bag;

(b) unpopped popcorn kernels within the expandable bag;

(c) an internal containment package positioned within the expandable bag, the internal containment package having a first cell and a second cell, the first cell positioned within the second cell;

(d) said first cell containing substantially only a liquid component, said liquid component consisting essentially of free water and salt contained with the first cell in an amount sufficient to burst the first cell, and then the second cell, upon microwave heating of said expandable bag with said internal containment package contained therein; and (e) an oil/fat component contained within the second cell external to the first cell; the internal containment package constructed and arranged, due to the increase of pressure therein during a microwave heating process, to burst, and release the oil/fat component contained therein, into said expandable bag;

wherein the internal containment package is disposed in a position substantially adjacent to the unpopped popcorn kernels, at least a portion of which are external to the containment package, and wherein the internal containment package is sealed or attached into an end seam or side seam of the expandable bag.

16. The popcorn product according to claim 15, wherein the microwaveable package is a flexible microwaveable bag configured for expansion.

17. The popcorn product according to claim 15, wherein the oil/fat component comprises a trans-fat free oil/fat.

* * * * *

UNITED STATES PATENT AND TRADEMARK OFFICE
CERTIFICATE OF CORRECTION

PATENT NO.        : 7,435,436 B2
APPLICATION NO. : 10/299537
DATED             : October 14, 2008
INVENTOR(S)      : Schilmoeller et al.

Page 1 of 1

It is certified that error appears in the above-identified patent and that said Letters Patent is hereby corrected as shown below:

Title page, Item (73) Assignee: "ConAgra Foods PDM, Inc." should read

--ConAgra Foods RDM, Inc.--

Signed and Sealed this

Seventeenth Day of February, 2009

JOHN DOLL
*Acting Director of the United States Patent and Trademark Office*